United States Patent [19]
Hoshino et al.

[11] Patent Number: 5,788,734
[45] Date of Patent: Aug. 4, 1998

[54] METHOD FOR DRAWING GLASS PREFORM FOR OPTICAL FIBER

[75] Inventors: Sumio Hoshino; Toshio Danzuka; Yuichi Ohga; Masumi Ito; Katsuzo Mukai, all of Yokohama, Japan

[73] Assignee: Sumitomo Electric Industries, Ltd., Osaka, Japan

[21] Appl. No.: 795,016

[22] Filed: Feb. 5, 1997

Related U.S. Application Data

[63] Continuation of Ser. No. 370,233, Jan. 9, 1995, Pat. No. 5,674,306, which is a continuation of Ser. No. 88,340, Jul. 9, 1993, abandoned.

[30] Foreign Application Priority Data

Jul. 9, 1992 [JP] Japan ................................. 4-182254
Jul. 21, 1992 [JP] Japan ................................. 4-193886
Jul. 21, 1992 [JP] Japan ................................. 4-193887

[51] Int. Cl.⁶ ............................................. C03B 37/027
[52] U.S. Cl. ........................ 65/385; 65/407; 65/421; 65/500
[58] Field of Search ..................... 65/385, 407, 421, 65/500, 17.3, 17.6, 435, 433, 533, 534, 535, 536, 483

[56] References Cited

U.S. PATENT DOCUMENTS

| 5,417,399 | 5/1995 | Saito ............................ 65/385 |
| 5,425,795 | 6/1995 | Koide et al. ................. 65/385 |

FOREIGN PATENT DOCUMENTS

| 0519468 | 12/1992 | European Pat. Off. |
| 54-2654 | 2/1979 | Japan ........................... 65/3.12 |
| 62-167236 | 7/1987 | Japan . |

OTHER PUBLICATIONS

Patent Abstracts of Japan, vol. 15, No. 328 (C–860) 21 Aug. 1991 & JP-A-03 126 633 (Fujikura Ltd.) 29 May 1991* abstract; figures 1, 2*.

Patent Abstracts of Japan, vol. 15, No. 52 (C–803) 7 Feb. 1991 & JP-A-02 283 631 (Fujikura Ltd.) 21 Nov. 1990* abstract; figures 1, 2*.

Patent Abstracts of Japan, vol. 12, No. 316 (C–524) 26 Aug. 1988 & JP-A-63 085 024 (Sumitomo Electric Ind Ltd.) 15 Apr. 1988* abstract*.

Patent Abstracts of Japan, vol. 12, No. 11 (C–468) 13 Jan. 1988 & JP-A-62 167 236 (Sumitomo Electric Ind. Ltd.), 23 Jul. 1987* abstract*.

Patent Abstracts of Japan, vol. 15, No. 167 (C–827) 26 Apr. 1991 & JP-A-03 037 128 (Fujikura Ltd.) 18 Feb. 1991* abstract; figure 1*.

Patent Abstracts of Japan, vol. 11, No. 267 (C–443) 28 Aug. 1987 & JP-A-62 070 243 (Sumitomo Electric Ind Ltd.) 31 Mar. 1987* abstract*.

Patent Abstracts of Japan, vol. 15, No. 128 (C–818) 28 Mar. 1991 & JP-A-03 012 336 (Fujikura Ltd.) 21 Jan. 1991* abstract; figures 1–3*.

Patent Abstracts of Japan, vol. 13, No. 579 (C–668) 20 Dec. 1989 & JP-A-01 242 433 (Fujikura Ltd.) 27 Sep. 1989* abstract*.

Patent Abstracts of Japan, vol. 15, No. 289 (C–852) 23 Jul. 1991 & JP-A-03 103 333 (Shin ETSU Chem. Co. Ltd.) 30 Apr. 1991* abstracts; figure 2*.

Patent Abstracts of Japan, vol. 14, No. 326 (C–740) 12 Jul. 1990 & JP-A-02 116 640 (Sumitomo Electric Ind. Ltd.) 1 Mau 1990* abstract*.

Patent Abstracts of Japan, vol. 12, No. 139 (C–491) 27 Apr. 1988 & JP-A-62 256 735 (Hitachi Cable Ltd.) 9 Nov. 1987* abstract*.

Patent Abstracts of Japan, vol. 14, No. 417 (C–756) 10 Sep. 1990 & JP-A-02 160 636 (Sumitomo Electric Ind. Ltd.) 20 Jun. 1990 *abstract*.

*Primary Examiner*—John Hoffmann
*Attorney, Agent, or Firm*—Cushman Darby & Cushman IP Group of Pillsbury Madison & Sutro LLP

[57] ABSTRACT

A glass preform for an optical fiber is effectively drawn by connecting dummy rods to both ends of the glass preform and connecting the dummy rods to fitting members.

6 Claims, 7 Drawing Sheets

METHOD FOR DRAWING GLASS PREFORM FOR OPTICAL FIBER

This is a continuation of application Ser. No. 08/370,233, filed Jan. 9, 1995, now U.S. Pat. No. 5,674,306 which is a continuation of Ser. No. 08/088,340 filed Jul. 9, 1993 (now abandoned).

BACKGROUND OF THE INVENTION

1. Field of the Invention

The present invention relates to a method and apparatus for drawing a glass preform, in particular, a glass preform having a large size to produce an optical fiber.

2. Description of the Related Art

A method for producing an optical fiber is explained by making reference to a vapor-phase axial deposition (VAD) method as an example.

In the VAD method, an oxyhydrogen flame is generated using a concentric multi-port burner. Into this flame, a glass-forming raw material such as $SiCl_4$, $SiHCl_3$, etc. and optionally a doping raw material such as $GeCl_4$, $POCl_3$, $BCl_3$, etc. are charged to form fine particles of glass (glass soot) through a flame hydrolysis reaction or an oxidation reaction, and the glass soot is deposited on a tip (distal) end or peripheral surface of a starting rod to form a glass soot-deposited body. Then, the glass soot-deposited body is vitrified in a heating furnace to obtain a transparent glass preform from which an optical fiber is produced.

A method for producing an optical fiber utilizing the above VAD method will be explained below.

Figure 1:
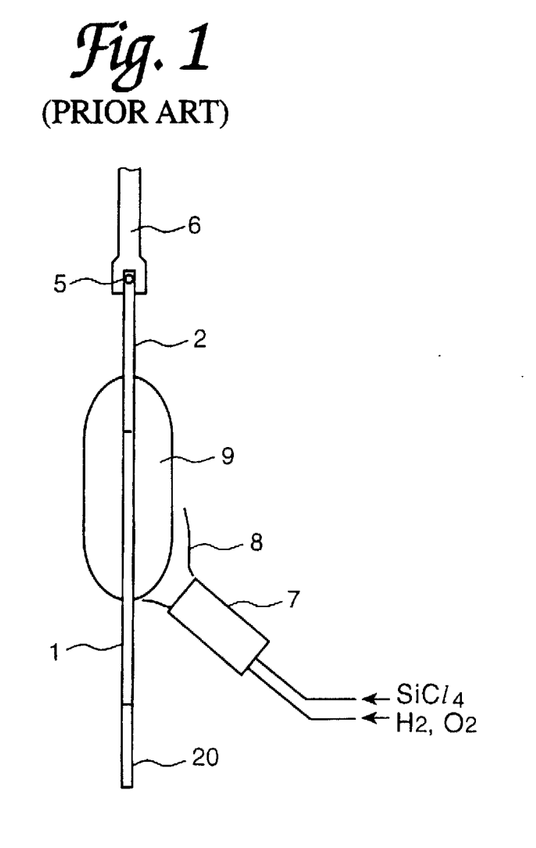
FIG. 1 schematically shows the VAD method for producing a glass preform for an optical fiber.

First, by the above VAD method, a core-forming glass preform consisting of a core portion or a core portion and a part of a cladding portion is synthesized on a tip end of a starting rod, dehydrated with a halogen-containing gas and vitrified. Thereafter, as shown in FIG. 1, the transparent glass rod (core-forming preform) is used as a starting member 1, and around a peripheral surface of the member 1 a glass soot 9 is deposited using a burner 7 for synthesizing fine particles of glass, which generates a flame 8. A composite of the glass rod and the glass soot 9 is again vitrified in the sintering furnace to obtain a glass preform for use in the production of the optical fiber. Thereafter, to the both ends of the glass preform, dummy rods are connected by welding, and a surface of the preform is flame abrased. The glass preform is then heated by an electric furnace or an oxyhydrogen flame and drawn to obtain a preform rod having a desired diameter. From the preform rod, an optical fiber is drawn.

Figure 2:
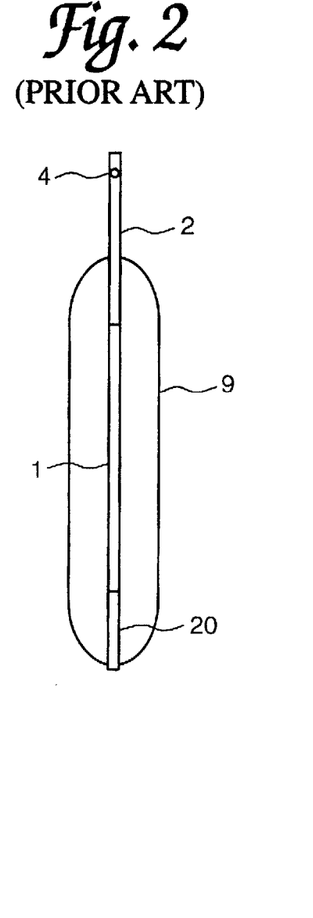
FIG. 2 shows a glass soot preform produced by the VAD method.

Hitherto, when the glass soot for the cladding portion is deposited on the glass rod consisting of the core portion or the core portion and a part of the cladding portion, to both ends of the glass rod 1 dummy (extension) rods 2 and 20 are welded as shown in FIG. 1, and the upper dummy rod 2 is held by a main seed rod 6 directly or through a fitting part 5. The dummy rods 2 and 20, and in particular, the lower dummy rod 20 are designed so that a tapered part of a growing surface which is unavoidable in the VAD method is not formed on the glass rod 1 for the core portion, and the glass soot 9 is deposited up to or near the end of the dummy rods 2 and 20, whereby a composite shown in FIG. 2 is produced.

Figure 3:
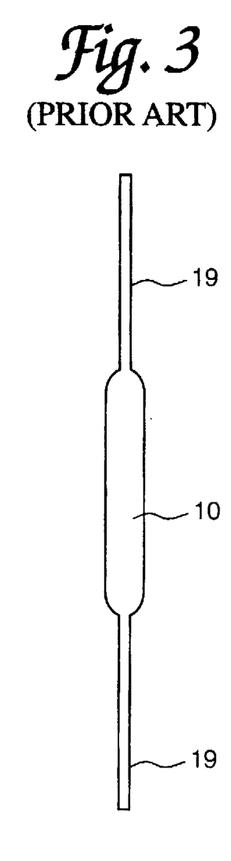
FIG. 3 shows a conventional glass preform having dummy rods.

To vitrify the composite in a sintering furnace and draw it, further dummy rods 19 are welded to the ends of the preform as shown in FIG. 3. The upper dummy rod may be once cut away and rewelded. The preform 10 having the dummy rods 19 at both ends is heated and drawn in the electric furnace.

In the above described conventional method, the dummy rods are welded using a horizontal glass lathe after vitrification and before drawing. As the preform is enlarged and its weight increases, it is difficult to support it by a single dummy rod. Therefore, it is necessary to hold an effective part of the preform 10, that is a part having a uniform diameter to be used for the production of the optical fiber. When the effective part of the glass preform is held or contacted by a foreign material, the glass surface can become flawed so that the resulting optical fiber does not possess sufficient strength. The foreign material can also contaminate the glass surface and increase transmission loss of the produced optical fiber. Consequently, the welding manner of the dummy rods to the glass preform is one of the most concerning problems in the production of the large-size glass preform.

For drawing the preform or preform rod, Japanese Patent Publication No. 167236/1987 discloses the use of a drawing apparatus which comprises a heating furnace for heating a glass preform and having a vertically extending opening, an upper chuck which holds one of the dummy rods and is provided above the heating furnace, and a lower chuck which holds the other of the dummy rods and is provided below the heating furnace. This reference also discloses a method for drawing the preform using such apparatus, which method comprises moving one of the chucks away from the heating furnace while moving the other of the chucks towards the heating furnace while heating the preform rod in the heating furnace.

When the long dummy rods are welded to and integrated with the glass preform, an overall length is very much increased so that handling is difficult. When a fitting member is attached to the dummy rod and the fitting member is held by the chuck, the length of the dummy rod can be shortened, while the glass preform tends to be bent during drawing.

SUMMARY OF THE INVENTION

One object of the present invention is to provide a method for producing a large glass preform having high quality and large strength and a method for producing an optical fiber from the large glass preform.

Another object of the present invention is to provide a method and apparatus for drawing a glass preform in which no long dummy rod is integrated with the glass preform and the glass preform is not bent during drawing.

According to a first embodiment of the present invention, there is provided a method for producing an optical fiber comprising steps of:

charging a glass-forming raw material to a flame generated by a burner to form glass soot through a flame hydrolysis reaction or an oxidation reaction, depositing said glass soot on a peripheral surface of a quartz glass rod consisting of a core portion or a core portion and a part of a cladding portion while relatively moving said burner and said glass rod to form a composite of said glass rod and said glass soot, sintering and vitrifying said deposited glass soot in a heating furnace to obtain a transparent glass preform for an optical fiber, drawing said preform to reduce its diameter, and further drawing said preform in a drawing furnace to obtain an optical fiber, wherein

3 a dummy rod is welded to each end of said quartz glass rod before depositing said glass soot, said glass soot is not deposited at a tip end part of each dummy rod while said glass soot is deposited in a tapered form from a middle portion of each dummy rod towards said glass rod and around the peripheral surface of said glass rod at a uniform outer diameter to form said glass rod/glass soot composite, and after sintering said composite, heating and making molten the composite in an electric furnace with holding each end part of said dummy rod and drawn to obtain the optical fiber.

According to the second embodiment of the present invention, there is provided a method for drawing a glass preform for an optical fiber comprising steps of:

holding each of the dummy rods which are integrally welded to respective ends of the glass preform with chucks and heating and drawing said glass preform in a heating furnace, wherein an end part of each dummy rod has a through hole which is formed across a center axis of said dummy rod and in which a pin is to be inserted, each dummy rod is connected with a respective fitting member having a depressed area in which said dummy rod is inserted and a through hole which is provided at a position corresponding to said through hole of said dummy rod and crosses a center axis of said fitting member at right angles, a heat-resistant pin is inserted in both through holes of said dummy rod and said fitting member to hold both ends of said glass preform by said fitting members, a difference between an inner diameter of said depressed area and an outer diameter of said dummy rod is in a range between 0.2 mm and 4 mm, and a length of a part of said dummy rod to be inserted in said depressed area is in a range between 50 mm and 150 mm.

According to a third embodiment of the present invention, there is provided a method for drawing a glass preform for an optical fiber comprising steps of:

connecting an end of each of the dummy rods which are integrally welded to the glass rod to a respective fitting member, holding each of said fitting members by a respective chuck and heating and drawing said glass preform in a vertical direction in a heating furnace, wherein at the start of drawing, the upper and lower fitting members are held by upper and lower chucks, respectively, and thereafter, a position to be held by said upper or lower chuck is changed from said upper or lower fitting member to another part, for example, the dummy rod.

According to a fourth embodiment of the present invention, there is provided an apparatus for drawing a glass preform for an optical fiber comprising a heating furnace, upper and lower chucks which independently move in a direction of a center axis of said heating furnace, and an auxiliary chuck which is provided between said heating furnace and said lower chuck and independently moves in the direction of the center axis of said heating furnace.

4

DETAILED DESCRIPTION OF THE INVENTION

The first method of the present invention will be explained by making reference to the accompanying drawings.

FIGS. 4(a) to 4(d) illustrate one embodiment of the first method of the present invention.

Figures 4A, 4B:
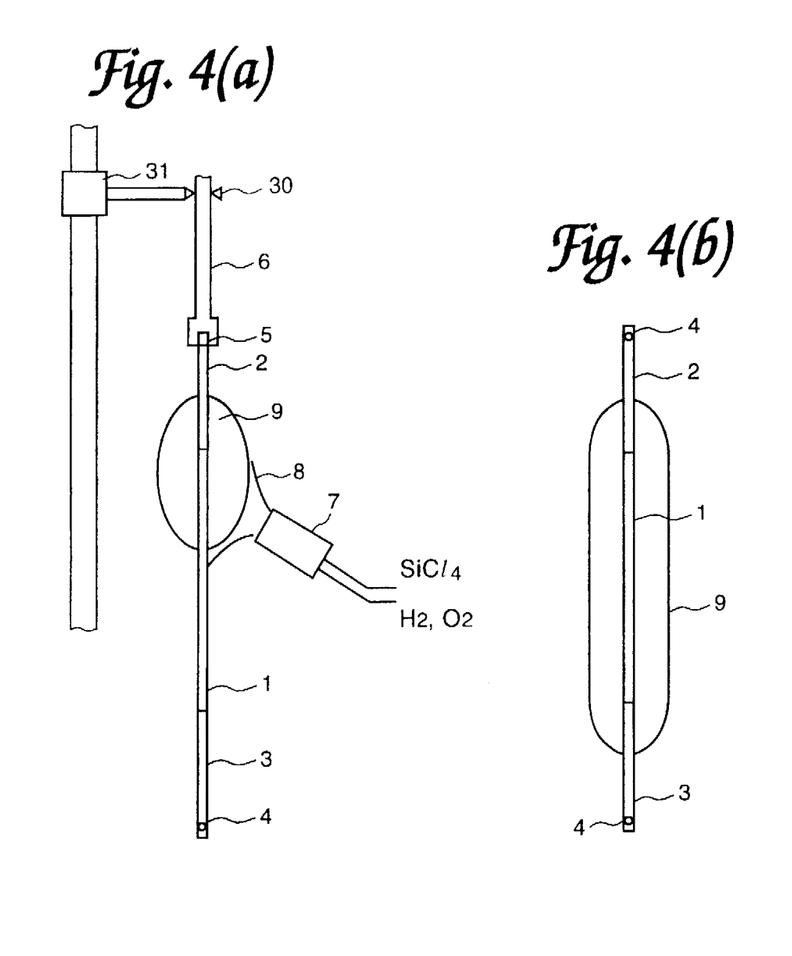
FIGS. 4(a) to 4(d) illustrate a first method for producing a glass preform according to the present invention.
Figure 4C:
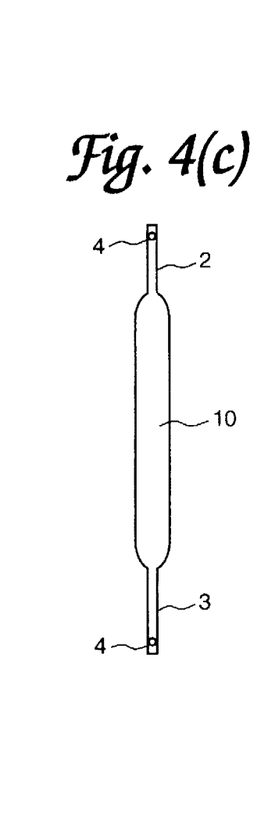

At the upper and lower ends of the quartz glass rod 1 comprising a core portion (hereinafter referred to as "core rod"), proximal and portions of upper and lower dummy rods (also referred to herein as first and second dummy rods, respectively) 2 and 3 are connected by welding, respectively. At a distal end portion of each of the upper and lower dummy rods 2 and 3, a fitting part is provided so that the dummy rod can be fit (attached) to a main rod (rotating shaft) (also referred to herein as a first fixing member) 6 or a fitting part of a chuck of a lathe for drawing. Each of the dummy rods 2 and 3 has a through hole 4 in the distal and portion thereof in which a fixing pin is inserted.

As the dummy rod, preferably a quartz glass rod which is produced by a conventional melting method or synthetic method is used. While a small amount of a dopant or impurities may be contained in the dummy rod, a glass having a very low melt viscosity is unpreferable since the dummy rod would be is deformed during sintering or drawing.

The length of each dummy rod is not critical. Since the tapered part of the deposited glass soot is formed on a part of the dummy rod, the length of the dummy rod is determined by the length of a part to be held and the length of the tapered part of the deposited glass soot. The length of the tapered part of the deposited glass soot is usually 0.5 to 1.0 time the outer diameter D of the glass soot deposit. Therefore, the length of the dummy rod is at least 1 to 1.5 times the outer diameter of the glass soot deposit to be formed. When the dummy rod is too long, the equipment for the production of the glass preform and a sintering furnace should be made large. In such a case, the length of the dummy rod is preferably at most 3.0 times the outer diameter of the glass soot deposit.

An outer diameter of each dummy rod is most preferably equal to the outer diameter of the core rod. When the outer diameter of the dummy rod is much larger than the outer diameter of the core rod, the glass soot deposit is deformed at the interface between the core rod and the dummy rod and, in an extreme case, the glass soot deposit is cracked. The outer diameter of the dummy rod is preferably from 0.9 to 1.3 times, and more preferably from 1.0 to 1.1 times the outer diameter d of the core rod.

To a lower fitting part 5 of the main rod 6 suspended in a reactor chamber for synthesizing glass soot, the end of upper dummy rod 2 is inserted. A pin is inserted in the through hole 4. A fitting through hole is formed at a position of the fitting part 5 corresponding to the through hole 4 in a direction perpendicular to the center axis of the fitting part 5, whereby the upper dummy rod 2 and the main rod 6 are connected.

Figure 5A:
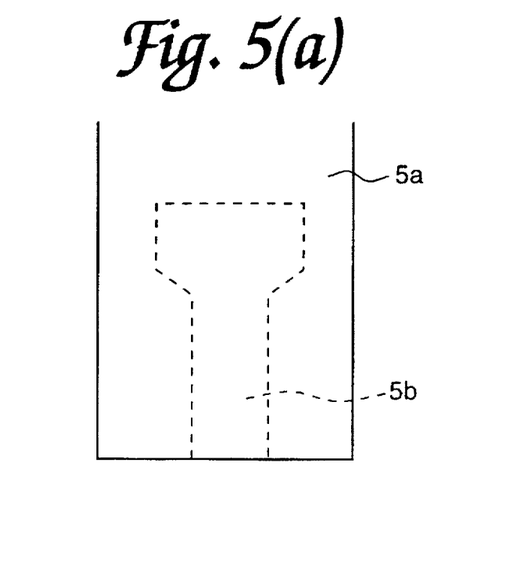
FIGS. 5(a) to 5(c) show an example of a method for fitting the dummy rod to the rotating shaft.
Figure 5B:
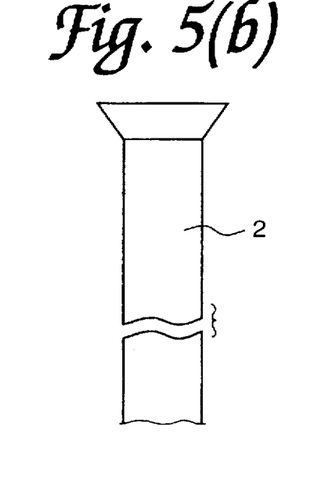
Figure 5C:
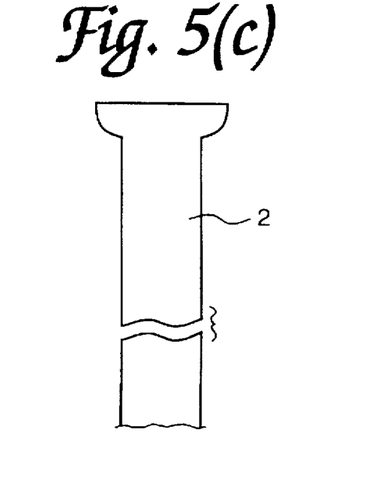

Any other means for fixing the upper dummy rod and the main rod at their fixing parts may be used. For example, as shown in FIGS. 5(a) to 5(c), the tip end of the upper dummy rod 2 has a larger diameter than the remainder of rod 2, while a part of a side wall of the depressed area 5a of the fitting part 5 is cut out. The dummy rod is inserted in the depressed area through the cut-out part 5b, and the weight of the dummy rod is supported by the large diameter part of the dummy rod.

After the upper dummy rod 2 is fit to the main rod 6, the glass-forming raw material, a combustion gas and a combustion-supporting gas are injected to a burner 7 to form glass soot in a flame 8, and the glass soot is deposited on a middle part of the upper dummy rod 2 (FIG. 4(a)).

Figure 4D:
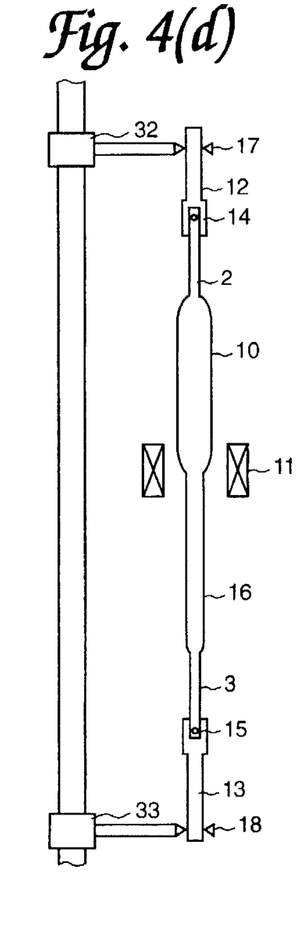

As mentioned above, the first fixing member 6 is rotatable and movable relative to the burner 7 along the longitudinal axis of the first fixing member 6. This rotational and longitudinal movement assists in obtaining a glass soot deposit 9 having an outer diameter of uniform thickness, as clearly shown in FIG. 4(b). The rotational and longitudinal movement can be accomplished, for instance, by connecting the first fixing member 6 to a first chuck 30 having a first mechanism 31 constructed and arranged to perform both the rotational and longitudinal movements. The obtained assembly consists of the core rod 1 and the upper and lower dummy rods 2, 3, on which and the glass soot deposit 9 (FIG. 4(b)) is sintered while maintaining the upper and lower dummy rods 2, 3 to obtain a transparent glass preform 10 (FIG. 4(c)). The tip ends of the upper and lower dummy rods 2, 3 are fit to respective fitting parts 14, 15 of upper and lower fitting members (also referred to herein as second and third fixing members, respectively) 12, 13 for drawing in an electric furnace. Then, the upper and lower fitting members 12, 13 are fixed to respective upper and lower chucks (also referred to herein as second and third chucks, respectively) 17, 18 of second and third mechanisms 32, 33, each being constructed and arranged both to rotate their respective fixing member 12, 13 about a longitudinal axis thereof and to move their respective fixing member 12, 13 in a direction along the longitudinal axis thereof. This longitudinal movement of the fixing members 12, 13 is further illustrated in FIGS. 6(a) and 6(e). The transparent glass preform 10 is heated and drawn to obtain a drawn preform 16 (FIG. 4(d)). Preferably, the preform 10 is fixed in the vertical direction and drawn in the vertical direction as shown in FIG. 4(d).

In the above embodiment, since the glass soot is not deposited on the end parts of the dummy rods, the end parts having no deposited glass soot are used as the fitting parts, so that it is not necessary to connect any additional dummy rods after the sintering and vitrification of the composite of the core rod and the glass soot deposit. Thereby, it is not necessary to hold the glass surface of the preform, and the transparent glass preform can be immediately drawn without touching its surface. As a result, flaws on the surface and contamination by impurities can be prevented, whereby a high quality optical fiber having good strength can be produced.

According to the above-described method of welding a dummy rod to the glass preform using the horizontal glass lathe, it was found that the maximum weight of the glass preform at that could be processed by holding one dummy rod without breakage was usually from 7 to 8 kg, and at most 10 kg with very careful work. Quartz glass, which is usually used for the production of the dummy rod, is easily cracked from a flaw by the application of a load, even if the dummy rod has a large diameter. Accordingly, the production of a large size glass preform has been limited in the above method using the horizontal glass lathe.

As seen from the Examples below, it is possible to produce the glass preform having a weight of more than 7 to 8 kg, and even more than 10 kg without difficulty, whereby the productivity of the glass preform and in turn the optical fiber is greatly increased.

Preferred examples of the first method of the present invention will be illustrated.

EXAMPLE 1

A core rod having a length of 800 mm and an outer diameter of 18 mm and consisting of a core portion and a part of a cladding portion was provided.

At each end of the core rod, a dummy rod having an outer diameter of 18 mm and a length of 500 mm was welded. A free end of each dummy rod had a through hole having a diameter of 5 mm. In the step for synthesizing the glass soot deposit, the upper dummy rod was fit to a fitting member having, at its tip end, a cylindrical depressed area in which the dummy rod was inserted and, in a wall of the cylindrical depressed area, a through hole with a diameter of 5 mm which vertically crossed the center axis of the fitting member, at a position corresponding to the through hole of the dummy rod. A ceramic pin having a diameter of 4.5 mm was inserted through the both holes to hold the dummy rod on the fitting member.

Then, the fitting member was fixed to a rotating shaft. On a peripheral surface of the core rod, glass soot deposit was synthesized at a uniform outer diameter of 220 mm. Lengths of tapered parts of the glass soot deposit formed on the upper and lower dummy rods were 160 mm and 180 mm, respectively.

A total weight of the core rod and the glass soot deposit was 13.4 kg.

After vitrifying the glass soot deposit in a sintering furnace, the composite of the core rod and the glass soot deposit was inserted in an electric furnace, and the end parts of the dummy rods were fit to and held by chucks with ceramic pins. While keeping the temperature of the electric furnace at 2000° C., the upper and lower chucks were traversed vertically at a rate of 10 mm/min. to draw the composite while controlling a traversing rate of the lower chuck so that the outer diameter of the preform was adjusted at 35 mm.

The produced drawn preform was further drawn in a drawing furnace to produce an optical fiber. In the production of the optical fiber having a length of 100 km, the fiber was not broken and had a transmission loss of only 0.35 dB/km at a wavelength of 1.3 μm.

EXAMPLE 2

This Example will clarify the influence of a relationship between an outer diameter of the dummy rod and an outer diameter of the core rod on the formation of cracks on a preform.

In the same constructions as in Example 5, five dummy rods having outer diameters of 16 mm, 18 mm, 19 mm, 22 mm and 24 mm were provided, and five glass soot deposits were synthesized for each dummy rod diameter. The core rod had an outer diameter of 18 mm, such that the outer diameters of the dummy rods were 0.88, 1.0, 1.05, 1.22 and 1.33 times the outer diameter of the core rod.

With the dummy rods of 18 mm and 19 mm in outer diameter, all five glass preforms were produced in good conditions. With the dummy rod of 22 mm in outer diameter, one of the preforms was cracked at its tip end when the glass soot deposit was formed on the lower molten part, while the other four glass preforms were produced in good conditions. With the dummy rod of 16 mm in diameter, only two glass preforms were produced in good conditions, and with the dummy rod of 24 mm in diameter, only one glass preform was produced in good condition.

Comparative Example 1

In the same manner as in Example 1, except that a core rod consisting of a core portion and a part of a cladding portion and having an outer diameter of 18 mm was used, and to the upper and lower end of the core rod, a dummy rod having an outer diameter of 18 mm and a length of 400 mm and a dummy rod having an outer diameter of 18 mm and a length of 200 mm were connected, respectively, a glass soot deposit was formed on the composite. Since the lower dummy rod was short, such that a part of 20 mm in length on which no glass soot was deposited was left at the tip end of the dummy rod. The total weight of the composite was 13.3 kg.

After vitrification, the upper dummy rod was held by the horizontal glass lathe, and a further dummy rod was welded to the lower dummy rod but the dummy rod was broken.

Then, an effective part of the preform was chucked, and further dummy rods were welded to both ends.

The preform having the welded dummy rods was drawn to an outer diameter of 35 mm and further drawn in a drawing furnace to produce an optical fiber. But, the fiber was broken eleven times per 100 km. The optical fiber which was produced from the part of the preform which had been chucked was most frequently broken. Some parts of the optical fiber had the transmission loss of 0.45 dB/km at the wavelength of 1.3 μm.

The second method of the present invention will be explained by making reference to the accompanying drawings.

According to this embodiment of the present invention, as shown in FIGS. 6(a) to 6(e), a length of the dummy rod 2 or 3 can be shortened by replacing a part of the dummy rod by an upper or lower fitting member 12 or 13, whereby the handling of the preform to which the dummy rods are connected is improved.

When the fitting members are connected to the ends of the preform, the extended body tends to bend. The present invention can prevent this bending.

Figure 6A:
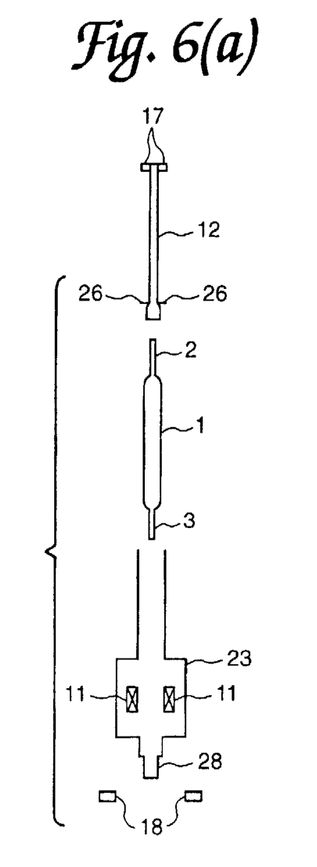
FIGS. 6(a) to 6(e) illustrate a second method for drawing a glass preform according to the present invention.
Figure 7A:
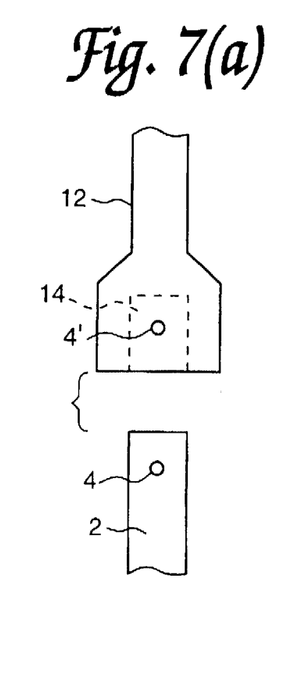
FIGS. 7(a) and 7(b) show an example of a method for fitting the dummy rod to the fitting member.

In this embodiment of the present invention, as shown in FIG. 6(a), glass rods having end structures such that the dummy rods can be fit to the glass rods are provided as upper and lower fitting members 12 and 13. To the upper and lower ends of the core rod 1, the upper and lower dummy rods 2 and 3 are welded, and the dummy rods have end structures that can be fit to the ends of the upper and lower fitting members 12 and 13, respectively. The dummy rods 2 and 3 which are welded to the upper and lower ends of the core rod 1 are inserted in respective fitting parts 14 and 15, and each pin made of a heat resistant material is inserted to a pair of through holes 4 and 4' and a pair of through holes 24 and 24' as shown in FIG. 7(a), whereby the upper and lower dummy rods are fixed to the upper and lower fitting members 12 and 13, respectively. Then, the fitting members 12 and 13 are held by upper and lower chucks 17 and 18 to fix the core rod 1 in a drawing apparatus, where heating and drawing occur.

The fixing method of the dummy rod to the fitting member will be explained further in detail.

As shown in FIG. 7(a), the dummy rod 2 or 3 is inserted in the fitting part 14 or 15 of the upper or lower fitting member 12 or 13 and fixed by inserting the heat resistant pin (not shown) in the through holes 4 and 4', or 24 and 24'. In this case, a difference (clearance) between the inner diameter of the fitting member and the outer diameter of the dummy rod is from 0.2 to 4 mm, and a length of the part of the dummy rod to be inserted in the fitting member is from 50 to 150 mm. To prevent the thermal deformation of the fitting members during drawing, the length of the dummy rods is selected so that the temperature of the fitting members does not exceed 1200° C.

As the difference between the inner diameter of the fitting member and the outer diameter of the dummy rod is smaller, the center axis of the fitting member is better aligned with the center axis of the dummy rod. But, when this difference is less than 0.2 mm, it is difficult to insert the dummy rod in the fitting member unless they are precisely processed. When this difference is larger than 4 mm, the center axis of the dummy rod is not well aligned with that of the fitting member so that the drawn preform tends to bend.

Figure 7B:
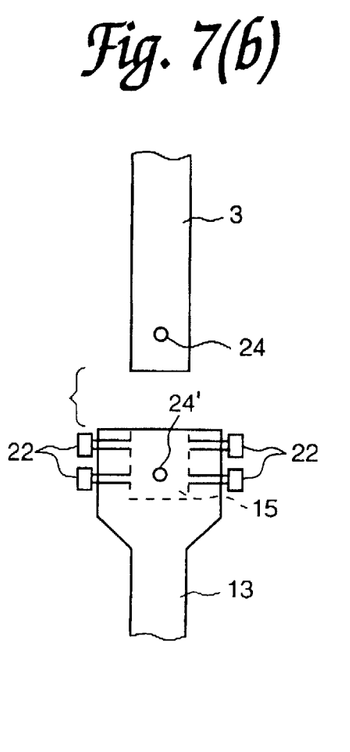

The center axes of the fitting member and the dummy rod are more precisely aligned with each other by the following manner:

The dummy rod is inserted in the fitting member and the heat resistant cylindrical pin is inserted in the through holes of the dummy rod and the fitting member. Thereafter, as shown in FIG. 7(b), bolts 22 are tightened to fix the dummy rod more rigidly to the fitting member. The bolts 22 are preinstalled in the lower fitting member 13 and directed to the center axis of the lower fitting member 13. Though not shown, the upper dummy rod can be fixed to the upper fitting member in the same manner. The bolts are preferably made of carbon or alumina. The number of bolts 22 employed is preferably from 2 to 8. Since the dummy rod is firmly fixed to the fitting member with the bolts, the center axis of the dummy rod is precisely aligned to that of the fitting member during the drawing of preform.

The use of the bolts is important for fixing the lower dummy rod to the lower fitting member. That is, since the lower dummy rod and the lower fitting member pull each other in the early stage of drawing, their center axes are easily aligned with each other. As the drawing of the glass preform progresses, the upper part of the glass preform is softened, and all the weight of the part below the softened part is applied to the lower fitting member. As the result, the lower dummy rod and the lower fitting member push each other. In this case, if the lower dummy rod is not firmly fixed to the lower fitting member, their center axes deviate from one another so that the drawn preform bends.

As explained above, when the glass preform is drawn using the fitting members, it is important to firmly fix the dummy rod to the fitting member by the use of the difference between the inner diameter of the fitting member and the outer diameter of the dummy rod or the bolts. Further, the fitting member should not be thermally deformed. The fitting member is preferably made of quartz glass to prevent contamination by impurities. To prevent the deformation of the fitting member, the length of the dummy rod should be selected so that the temperature of the fitting member does not exceed 1200° C. as explained already.

Figure 6B:
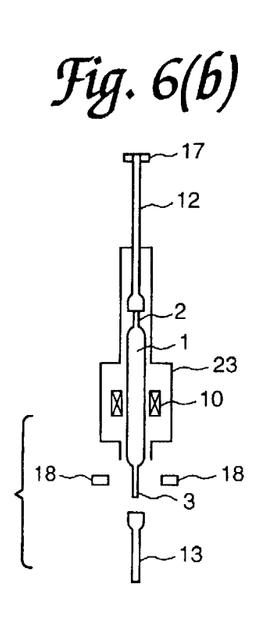

According to this embodiment of the present invention, a part of the dummy rod is replaced by the fitting member so that the length of the dummy rod can be shortened as shown in FIG. 6(b).

This embodiment of the present invention will be illustrated by the following Examples further in detail.

EXAMPLE 3

This Example will be explained by making reference to FIGS. 6(a) to 6(e) and FIGS. 7(a) and 7(b).

(1) To both end of a core rod consisting of a core portion and a part of a cladding portion, dummy rods each having a length of 300 mm were connected. Glass soot was deposited on the peripheral surface of the core rod and vitrified to obtain a glass preform 1 having an outer diameter of 58 mm and a length of 300 mm. The dummy rods 2 and 3 had, at their ends, through holes each having a diameter of 4 mm in a direction perpendicular to the center axes of the dummy rods.

(2) An apparatus for drawing the glass preform comprised a heating furnace 23 (electric resistance furnace) and chucks 17 and 18 (FIG. 6(a)). The chucks 17 and 18 vertically moved independently. To the upper chuck 17, the fitting member 12 having a length of 500 mm was fixed. The glass preform 1 was fixed to the fitting member 12 by inserting the dummy rod 2 in the fitting member 12 and inserting the alumina pin in the through holes 4 and 24 (FIG. 6(b) and FIG. 7(a)). A length of the part of the dummy rod 2 inserted in the fitting member 12 was 60 mm. The inner diameter of the depressed area of the fitting member 6 was 30.5 mm, while the outer diameter of the upper dummy rod 2 was 30.0 mm.

Thereafter, the glass preform was passed through the heating furnace 23 by lowering the upper chuck 17, and the lower part of the lower dummy rod 3 protruded beyond the lower end of the furnace 23 (FIG. 6(b)). The end of the lower dummy rod 3 was inserted in the lower fitting member 13, and the alumina pin was inserted in the through holes 24 and 24' to fix the lower dummy rod 3 to the lower fitting member 13. Then, the four carbon bolts 22 were tightened up (see FIG. 7(b)). The inner diameter of the depressed area 15 of the lower fitting member 13 was 30.5 mm, while the outer diameter of the lower dummy rod was 30.0 mm. A length of the part of the lower dummy rod inserted in the depressed area 15 of the fitting member was 100 mm.

(3) After fixing the lower fitting member 13, the upper chuck 17 was lifted up so that the lower end of the preform 1 was adjusted to the level of the heater 11. Then, the lower fitting member 13 was held by the lower chuck 18 (FIG. 6(c)).

After the preform 1 was thoroughly heated, the upper chuck 17 was lowered at a rate of 10 mm/min. while the lower chuck 18 was lowered at a rate of 54 mm/min. (FIG. 6(d)).

Figure 6C:
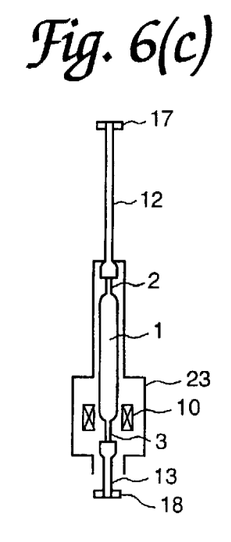
Figure 6D:
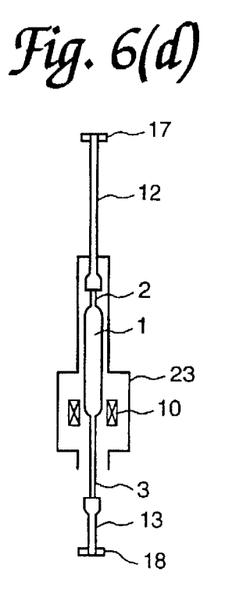
Figure 6E:
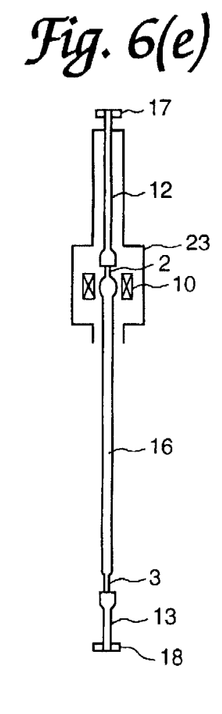

When the upper chuck was lowered by a distance of 300 mm, the drawing was finished (FIG. 6(e)).

In the above lowering step, the heater temperature was kept at 1950° C., and the maximum temperature of the fitting member reached 1000° C.

In FIG. 6(a), numerals 26 and 28 stand for a shielding plate and a lower lid, respectively.

By the above method, a glass preform for an optical fiber having an outer diameter of 25 mm and a length of 1.6 m which was not bent was obtained.

Comparative Example 2

In the same manner as in Example 3 except that a lower dummy rod having an outer diameter of 25 mm was used, that is, a difference between the inner diameter of the fitting member and the outer diameter of the dummy rod was 5.5 mm, and no bolt was used, the glass preform was drawn. The glass preform could be drawn under the same conditions as in Example 3 in the early stage of drawing, but after 20 minutes from the start of drawing, the center axis of the lower dummy rod deviated from the center axis of the lower fitting member so that the drawn body greatly bent.

EXAMPLE 4

To each end of a glass preform having a length of 400 mm and an outer diameter of 60 mm, a dummy rod having an outer diameter of 30.0 mm and a length of 300 mm was welded. At the free end of each dummy rod, a through hole having an inner diameter of 4 mm had been bored in a direction perpendicular to the center axis of the dummy rod.

Thereafter, the glass preform was drawn in the same manner as in Example 3. A length of the part of the dummy rod 2 inserted in the fitting member 12 was 60 mm, the inner diameter of the depressed area of the fitting member 12 was 32.5 mm and the outer diameter of the upper dummy rod 2 was 31.0 mm.

The drawn body did not bend.

In addition to the ceramic or alumina pin, a carbon or SiC-coated carbon pin may be used.

Now, the method and apparatus according to the final aspect of the present invention will be explained.

This embodiment is a modification of the above described second method according to the present invention.

In this embodiment, an end of each of the dummy rods which are welded to the glass preform is connected to the respective fitting members. Then, each fitting member is held by a respective chuck of the drawing apparatus, and the glass preform is heated and drawn in a heating furnace in a vertical direction. At the start of drawing, each of the upper and lower fitting members is held by each of upper and lower chucks, respectively, and thereafter, a position to be held by the upper or lower chuck is changed from the upper or lower fitting member to other part, for example, the respective dummy rod, thereby a distance in which the chuck moves is shortened.

Figure 8A:
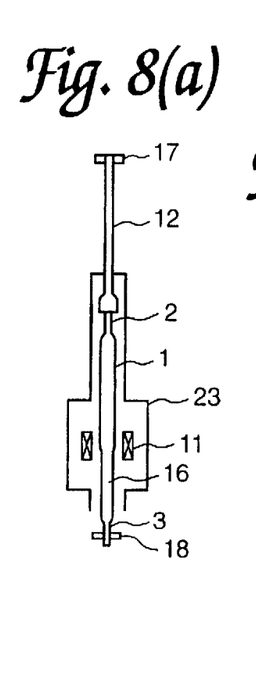
FIGS. 8(a) to 8(c), FIGS. 9(a) to 9(i), FIGS. 10(a) to 10(c), and FIGS. 11(a) and 11(b) illustrate examples of the third method for drawing a glass preform according to the present invention.

In this embodiment, the glass preform is drawn in substantially the same manner as shown in FIGS. 6(a) to 6(d). Then, the position to be held by the chuck is changed to the dummy rod as shown in FIG. 8(a).

The change of holding position of the lower chuck from the lower fitting member to the lower dummy rod is carried out by moving the auxiliary chuck at the same speed as the lower chuck after the lower dummy rod exits from the lower end of the furnace. The central part of the lower dummy rod is held with the auxiliary chuck Then, the lower chuck is loosened, and the lower fitting member is disconnected from the dummy rod. Thereafter, the lower chuck is lifted up, or the auxiliary chuck is lowered while stopping the lower chuck, whereby the lower chuck is moved to the level of the lower dummy rod. While the lower chuck is moved at the same speed as the auxiliary chuck, the lower dummy rod was held by the lower chuck, and the auxiliary chuck is loosened and its movement is stopped. As the result, the drawing is continued without stopping, and the holding position of the lower chuck is changed from the lower fitting member to the lower dummy rod. To achieve such action, the auxiliary chuck should be moved at the same speed as the lower chuck.

In addition, using the auxiliary chuck, it is possible to change the holding position after the completion of drawing.

When the holding position of the lower chuck is changed during drawing of the glass preform, the drawn preform may be bent if the center axis of the fitting member is only slightly deviated from the center axis of the dummy rod. The use of the auxiliary chuck can prevent such bending of the drawn preform.

Figure 8B:
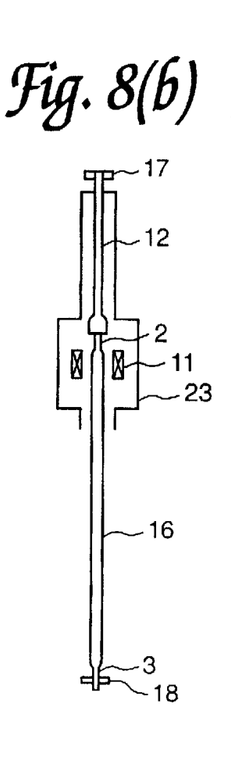

After the completion of drawing, the drawn glass preform is to be removed from the heating (drawing) furnace. To this end, as shown in FIG. 8(b), the upper end of the drawn preform is heated and further drawn to reduce the diameter, and the thin part 16' is broken to remove the drawn preform from the furnace (FIG. 8(c)).

At the end of drawing, the weight of the drawn preform is supported only by the lower chuck. If the lower chuck is loosened, the preform is not supported and gradually drops since the part remained in the furnace is softened. In such case, the auxiliary chuck supports the drawn preform advantageously.

Figures 9A, 9B, 9C:
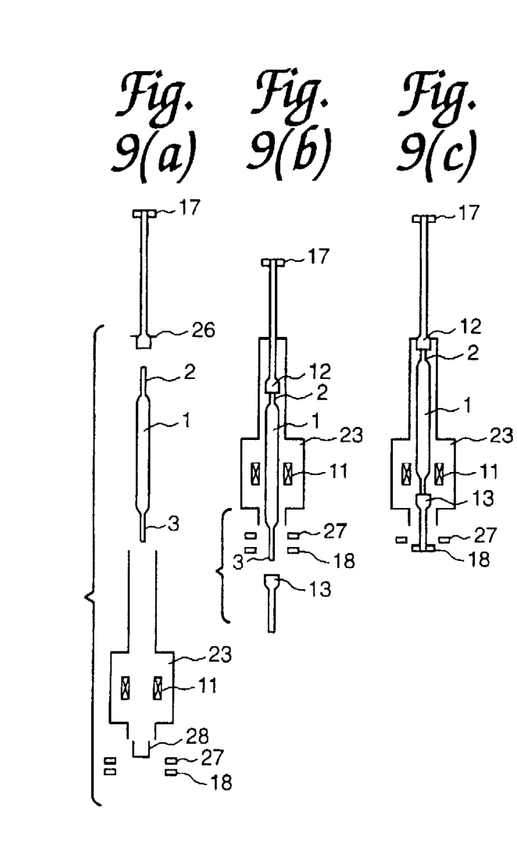
Figure 9D:
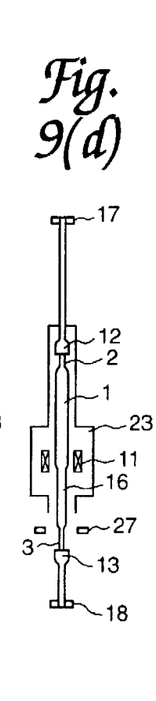
Figure 9E:
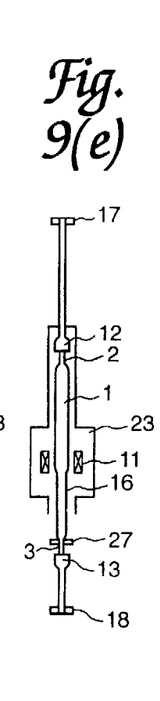
Figures 9F, 9G:
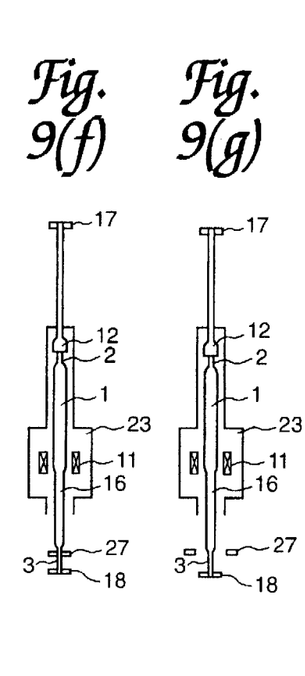
Figure 9H:
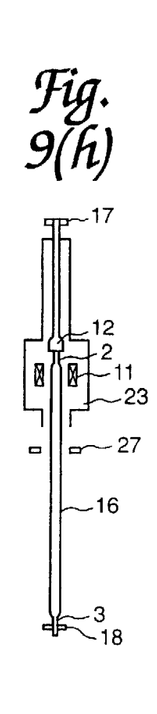
Figure 9I:
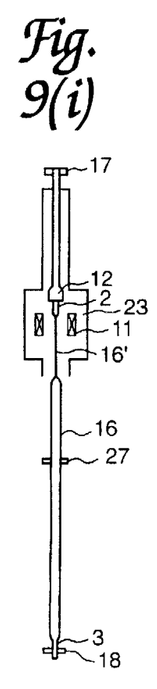
Figure 10A:
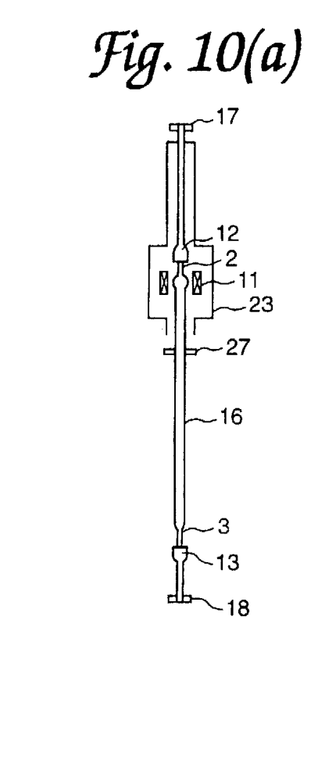
Figure 10B:
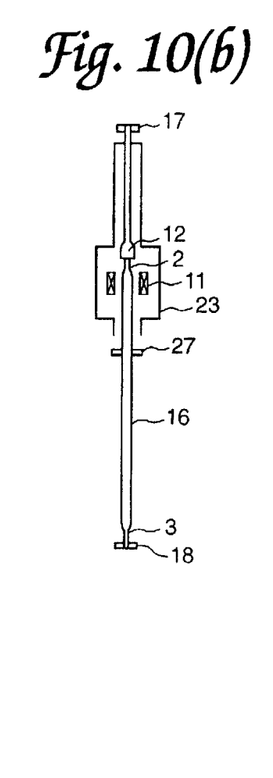
Figure 10C:
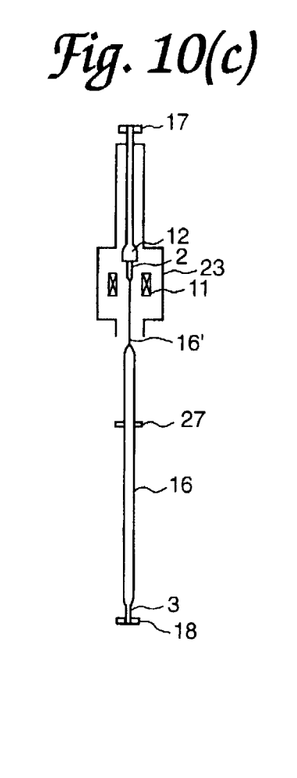
Figure 11A:
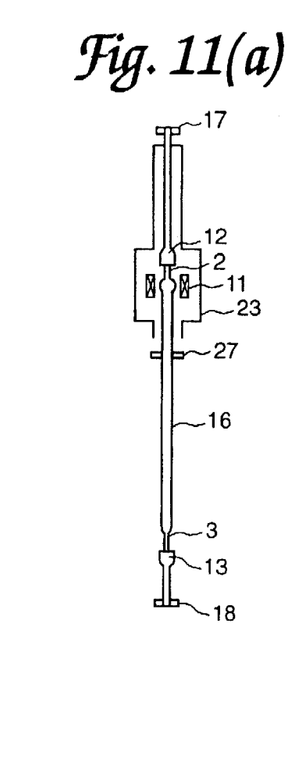
Figure 11B:
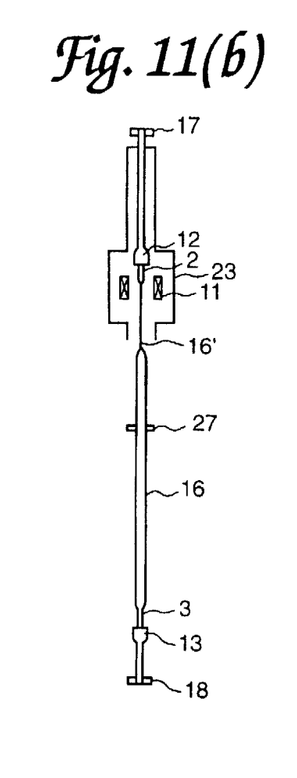

That is, according to this embodiment of the present invention, before reducing the diameter of the upper part of the drawn preform, the drawn preform is held by the auxiliary chuck as shown in FIGS. 9(i), 10(c) and 11(b) to support the drawn preform by the auxiliary chuck and the lower chuck, and the both chucks are lowered at the same speed to reduce the diameter of the upper part of the drawn preform.

In this step, by supporting the drawn preform by the auxiliary chuck and the lower chuck, the upper part of the drawn preform is more safely drawn than when the drawn preform is supported by the lower chuck only. In particular, when the thin part 16' is broken and the drawn preform is removed from the furnace, the drawn preform may be unstabilized if it is supported by the lower chuck only. When the drawn preform is supported by the lower chuck and also the auxiliary chuck, it is stabilized and safety of the handling is improved.

The above embodiment of the present invention will be illustrated by the following Examples.

EXAMPLE 5

Figure 8C:
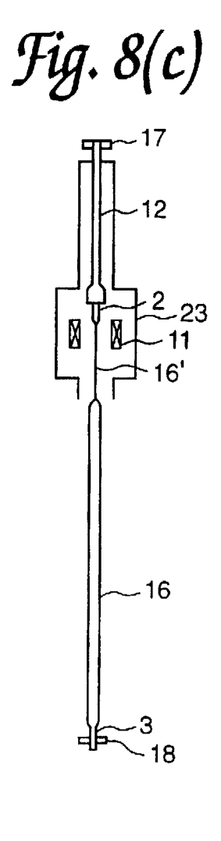

In this Example, the glass preform was drawn by the method comprising the steps (a) to (d) of FIG. 6 and the steps (a), (b) and (c) of FIG. 8.

After the lower opening of the furnace 23 was closed with the lower lid 28 and an inert gas was supplied into the furnace from an inlet for supplying an inert gas (not shown), the internal temperature of the furnace was raised to a determined temperature by the heater 11.

The glass preform 1 for the optical fiber to which the upper and lower dummy rods 2 and 3 each having a length of 200 mm were welded was attached to the lower end of the upper fitting member 12, and the cylindrical pin made of alumina was inserted in the through holes of the upper dummy rod 2 and the upper fitting member 12, whereby the glass preform was fixed (FIG. 6(a)).

The glass preform 1 for the optical fiber had an outer diameter of 55 mm and a length of 400 mm.

The glass preform 1 was inserted in the heating furnace 23, and the lower lid 28 was opened. The tip end of the lower dummy rod 3 was protruded beyond the lower opening of the furnace 23 (FIG. 6(b)). Then, the end of the lower dummy rod 3 was inserted in the lower fitting member 13 and fixed with the cylindrical pin made of alumina in the same manner as above.

After the opening of the lower lid 28, the upper opening was closed by the vertically movable shielding plate 26 attached to the upper fitting member 12 so that the interior of the furnace was filled with the inert gas (FIG. 6(c)).

The lower end of the glass preform 1 was adjusted at the level of the heater 11, and the lower fitting member 13 was held by the lower chuck 18. Then, the upper chuck 17 was lowered at the rate of 10 mm/min. while the lower chuck 18 was lowered at the rate of 53 mm/min. to draw the glass preform 1. When the lower dummy rod 13 came out from the furnace 23 as shown in FIG. 6(d), the upper and lower chucks 17 and 18 were stopped to suspend the drawing (FIG. 6(d)).

Then, the lower chuck 18 was loosened and the lower fitting member 13 was removed. Thereafter, the lower chuck 18 was lifted up to the position of the lower dummy rod 3 and grasped the end of the lower dummy rod 3, and the drawing of the glass preform was restarted (FIG. 8(a)).

When the drawing of the glass preform was further carried out and the upper end of the glass preform 1 reached the level of the heater 27, the drawing was terminated (FIG. 8(b)).

Only the lower chuck 18 was further lowered to reduced the diameter of the upper end of the drawn preform (FIG. 8(c)), and the thin part 16' was broken (FIG. 8(h)) to remove the drawn preform 16 from the furnace.

By the above method, the drawn preform having an outer diameter of 24 mm and a length of 2100 mm was produced.

EXAMPLE 6

In this Example, the glass preform was drawn by the method comprising the steps (a) to (i) of FIG. 9.

After the lower opening of the furnace 23 was closed with the lower lid 28 and an inert gas was supplied into the furnace from an inlet for supplying an inert gas (not shown), the internal temperature of the furnace was raised to a determined temperature by the heater 27.

As shown in FIG. 9(a), glass preform 1 for the optical fiber to which the upper and lower dummy rods 2 and 3 were connected was attached to the lower end of the upper fitting member 12 which was fixed to the upper chuck 17.

The glass preform 1 was produced by integrally welding the dummy rods each having a length of 300 mm to both ends of the glass rod consisting of the core portion and a part of the cladding portion, depositing the glass soot around the glass rod and the dummy rods, and heating the composite of the glass rod and the glass soot deposit in the heating furnace to vitrify the glass soot deposit.

Between the heating furnace 23 and the lower chuck 18, an auxiliary chuck 27 was provided.

In the same way as in Example 5, the lower dummy rod 3 was attached to the lower fitting member 13, and the lower fitting member 13 was held by the lower chuck 18. Then, the drawing of the glass preform 1 was started (FIGS. 9(b) and 9(c)).

When the lower dummy rod 13 came out from the furnace 23 and the central part of the dummy rod 3 reached the level of the auxiliary chuck 27, the auxiliary chuck 27 and the lower chuck 18 were lowered at the same rate (FIG. 9(d)). While the auxiliary chuck 27 and the lower chuck 18 were lowered at the same rate, the central part of the dummy rod 3 was held by the auxiliary chuck 27, that is, the holding position was changed (FIG. 9(e)).

Then, the lower chuck 18 was loosened and the lower fitting member 13 was removed. Thereafter, the lower chuck 18 was lifted up to the position of the lower end of the lower dummy rod 3 and grasped the end of the lower dummy rod 3 while lowering the auxiliary chuck 27 and the lower chuck 18 at the same rate, and the lower dummy rod 3 was held by the lower chuck 18 (FIG. 9(f)). Then, the auxiliary chuck 27 was loosened and its movement was finished (FIG. 9(g)).

As shown in FIG. 9(h), when the upper part of the glass preform reached the level of the heater 11, the drawing was terminated by stopping the lowering of the upper and lower chucks 17 and 18.

As shown in FIG. 9(i), the drawn preform 1 was held by the auxiliary chuck 27, and the auxiliary chuck 27 and the lower chuck 18 were lowered at the same rate to reduced the diameter of the upper end of the drawn preform 16, and the thin part 16' was broken to remove the drawn preform 16 from the furnace.

By the above method, the drawn preform having an outer diameter of 24 mm and a length of 2100 mm was produced.

EXAMPLE 7

In the same manner as the steps (a) to (d) of FIG. 9 in Example 6, the glass preform 1 was fixed to the chucks and its drawing was started.

During the drawing, the holding position by the lower chuck 13 was not changed and the drawing was carried out until the upper part of the glass preform 1 reached the level of the heater 11. Then, the lowering of the upper and lower chucks 17 and 18 was stopped, and the drawn preform was held by the auxiliary chuck 27 (FIG. 10(a)).

The lower chuck 18 was loosened and the lower fitting member 13 was removed. Thereafter, the lower chuck 18 was lifted up to the position of the lower end of the lower dummy rod 3 and held the end of the lower dummy rod 3 (FIG. 10(b)).

Then, in the same manner as in Example 6, the upper part of the drawn preform was further drawn to reduce its diameter, and the thin part 16' was broken to remove the drawn preform 16 from the furnace (FIG. 10(c)).

By the above method, the drawn preform having an outer diameter of 24 mm and a length of 2100 mm was produced.

In Examples 5, 6 and 7, when a glass preform having an outer diameter of 55 mm and a length of 400 mm is drawn to the drawn preform having an outer diameter of 24 mm and a length of 2100 mm, and each dummy rod has a length of about 200 mm to 300 mm, a height of the apparatus is about 4300 mm. When no fitting member is used, each dummy rod should have a length of about 1000 mm, so that the height of the apparatus should be about 4700 mm.

EXAMPLE 8

In this Example, the glass preform was drawn by the method comprising the steps (a) to (d) of FIG. 9 and the steps (a) and (b) of FIG. 11.

First, to the both ends of the glass preform having an outer diameter of 60 mm and a length of 400 mm, dummy rods each having an outer diameter of 30.0 mm and a length of 300 mm were welded. A free end of each dummy rod had a through hold having an inner diameter of 4 mm.

The upper and lower dummy rods 2 and 3 were inserted in the upper and lower fitting members 17 and 18, and alumina pins were inserted in the through holes of the dummy rods and the fitting members, whereby the glass preform was fixed. Further, the lower dummy rod was further fixed to the lower fitting member by tightening the four carbon bolts.

The depressed area of each fitting member had an inner diameter of 30.5 mm, and an outer diameter of each dummy rod was 30.0 mm. A length of the part of the upper dummy rod 2 to be inserted in the depressed area of the upper fitting member was 60 mm, and that of the lower dummy rod 3 was 100 mm.

After fixing the lower fitting member, the upper chuck 17 was lifted up so that the lower end of the glass preform 1 was adjusted at the level of the heater 27, and the lower fitting member 13 was held by the lower chuck 18 (FIG. 9(c)). The heater temperature was adjusted at 1950° C. After the glass preform 1 was well heated, the upper chuck 17 was lowered at the rate of 10 mm/min. while lower chuck 18 was lowered at the rate of 54 mm/min. to draw the glass preform 1 (FIG. 9(d)). When the upper chuck 17 was lowered by 300 mm, the drawing was terminated (FIG. 11(a)). At this stage, the drawn preform was held by the auxiliary chuck 27 as shown in FIG. 11(a).

Then, the auxiliary chuck 68 and the lower chuck 18 were lowered at the same rate to reduced the diameter of the upper end of the drawn preform as shown in FIG. 11(b), and the thin part 16' was broken to remove the drawn preform from the furnace.

The maximum temperature of the fitting members was 1000° C.

By the above method, the drawn preform which did bend was produced.

What is claimed is:

1. A method of producing an optical fiber comprising the steps of:

providing a quartz glass rod having a first end portion and a second end portion;

providing first and second dummy rods, said dummy rods each having a proximal end portion and a distal end portion with a through hole formed through said distal end portion so that said through hole intersects a center axis of said dummy rod in a direction perpendicular to said center axis of said dummy rod;

fusion bonding said proximal end portions of said first and second dummy rods to said first and second end portions of said glass rod, respectively, to form an assembly such that said center axes of said dummy rods are substantially collinear with a center axis of said glass rod;

providing a first fixing member that is vertically oriented and fixed to a first chuck having a first mechanism constructed and arranged both to rotate said first fixing member about a longitudinal axis of said first fixing member and to move said first fixing member in a direction alone said longitudinal axis of said first fixing member, said first fixing member having a depressed area for receiving said distal end portion of said first dummy rod and a through hole intersecting a center axis of said first fixing member;

supporting said assembly with said first fixing member by inserting said distal end portion of said first dummy rod in said depressed area of said first fixing member, aligning said through hole of said first dummy rod with said through hole of said first fixing member, and inserting a first pin through said aligned through holes of said first dummy rod and said first fixing member;

supplying a glass-forming raw material to a flame generated by a burner to form glass soot through a flame hydrolysis reaction or an oxidation reaction;

depositing said glass soot on a peripheral surface of said glass rod while moving said burner relative to said glass rod to form a composite of said glass rod and said glass soot, at least a portion of said composite having an outer diameter of uniform thickness;

introducing said composite into a first heating furnace;

sintering and vitrifying said glass soot in said first heating furnace while supporting said composite with said second fixing member to obtain a transparent glass preform;

providing a second fixing member as an upper fixing member and a third fixing member as a lower fixing member, said second and third fixing members being vertically oriented and fixed to a second chuck and a third chuck, respectively, said second and third chucks having respective second and third mechanisms each constructed and arranged both to rotate said respective fixing member about a longitudinal axis of said respective fixing member and to move said respective fixing member in a direction alone said longitudinal axis of said respective fixing member, and said second and third fixing members each having a depressed area for receiving each of said distal end portions of said first and second dummy rods, respectively, and a through hole intersecting a center axis of said fixing member;

detaching said distal end portion of said first dummy rod from said first fixing member;

supporting said transparent glass preform with said second fixing member by inserting said distal end portion of said first dummy rod in said depressed area of said second fixing member, aligning said through hole of said first dummy rod with said through hole of said second fixing member, and inserting a second pin through said aligned through holes of said first dummy rod and said second fixing member;

inserting said transparent glass preform in a second heating furnace for elongation;

connecting said second dummy rod to said third fixing member by inserting said distal end portion of said second dummy rod in said depressed area of said third fixing member, aligning said through hole of said second dummy rod with said through hole of said third fixing member, and inserting a third pin through said aligned through holes of said second dummy rod and said third fixing member;

elongating said transparent glass preform in said second heating furnace by disposing said transparent glass preform in said second heating furnace and moving said second fixing member relative to said third fixing member to increase a distance therebetween so as to obtain an elongated glass preform;

detaching said second and third fixing members from said first and second dummy rods, respectively;

removing said first and second dummy rods from said elongated glass preform; and drawing said elongated glass preform to obtain said optical fiber.

2. The method according to claim 1, wherein said first and second dummy rods each has a length of 1 to 3 times an outer diameter of said glass soot.

3. The method according to claim 1, wherein said first and second dummy rods each has a diameter of 0.9 to 1.3 times an outer diameter of said quartz glass rod.

4. The method according to claim 1, wherein a difference between a diameter of said depressed area of said first fixing member and an outer diameter of said first dummy rod is between 0.2 mm and 4 mm, and a length of a part of said first dummy rod inserted in said depressed area of said first fixing member is between 50 mm and 150 mm.

5. The method according to claim 4, wherein each of said fixing members has 2 to 8 bolts which are tightened from a periphery thereof to fix said respective dummy rod thereto.

6. The method according to claim 4, wherein a temperature of each of said fixing members does not exceed 1200° C.

* * * * *